July 11, 1939.　　F. E. SCHWENTLER　　2,165,985
PISTON TRAVEL AMPLIFIER
Filed May 22, 1937　　2 Sheets-Sheet 1
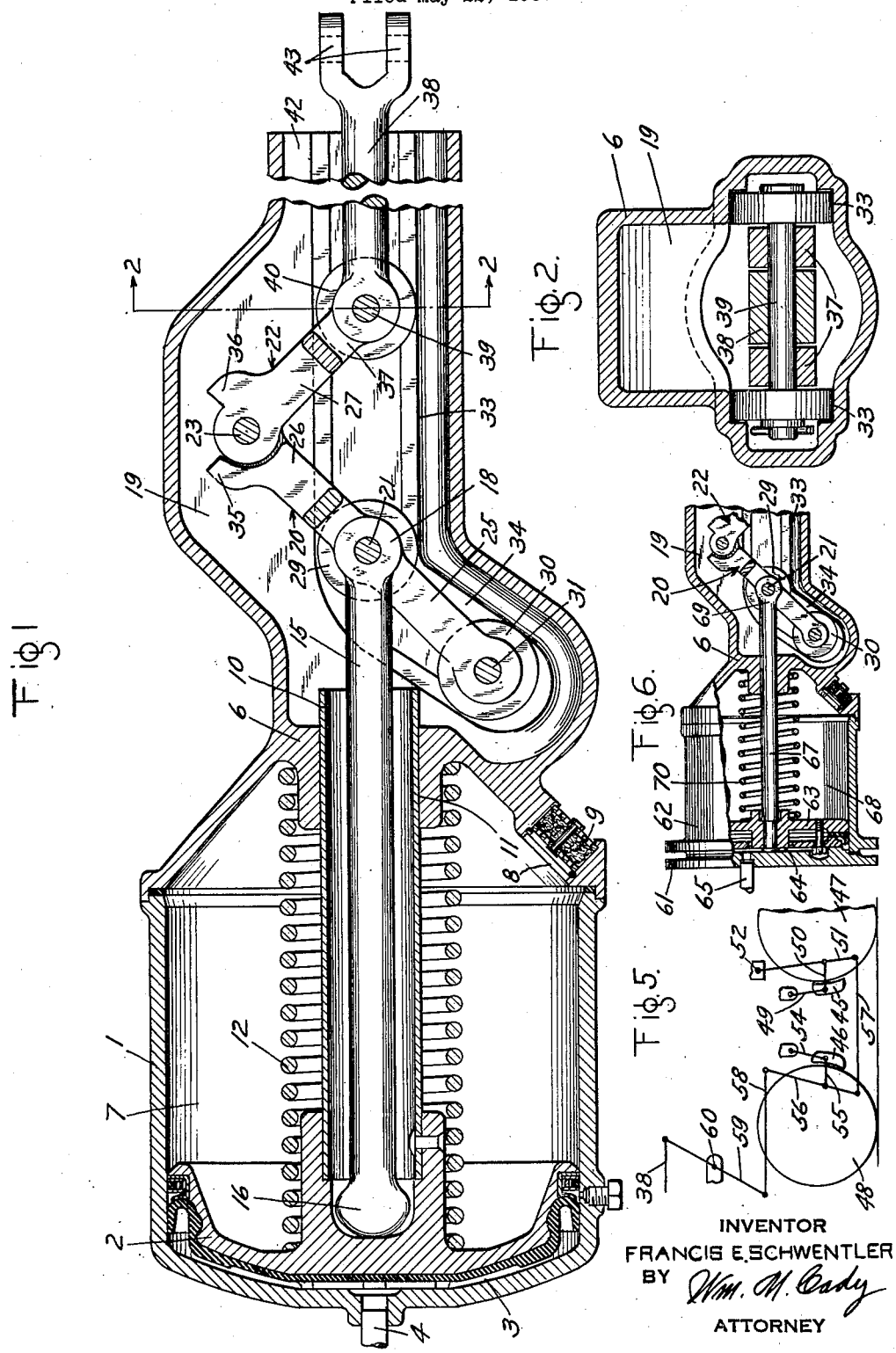
INVENTOR
FRANCIS E. SCHWENTLER
BY Wm. M. Cady
ATTORNEY

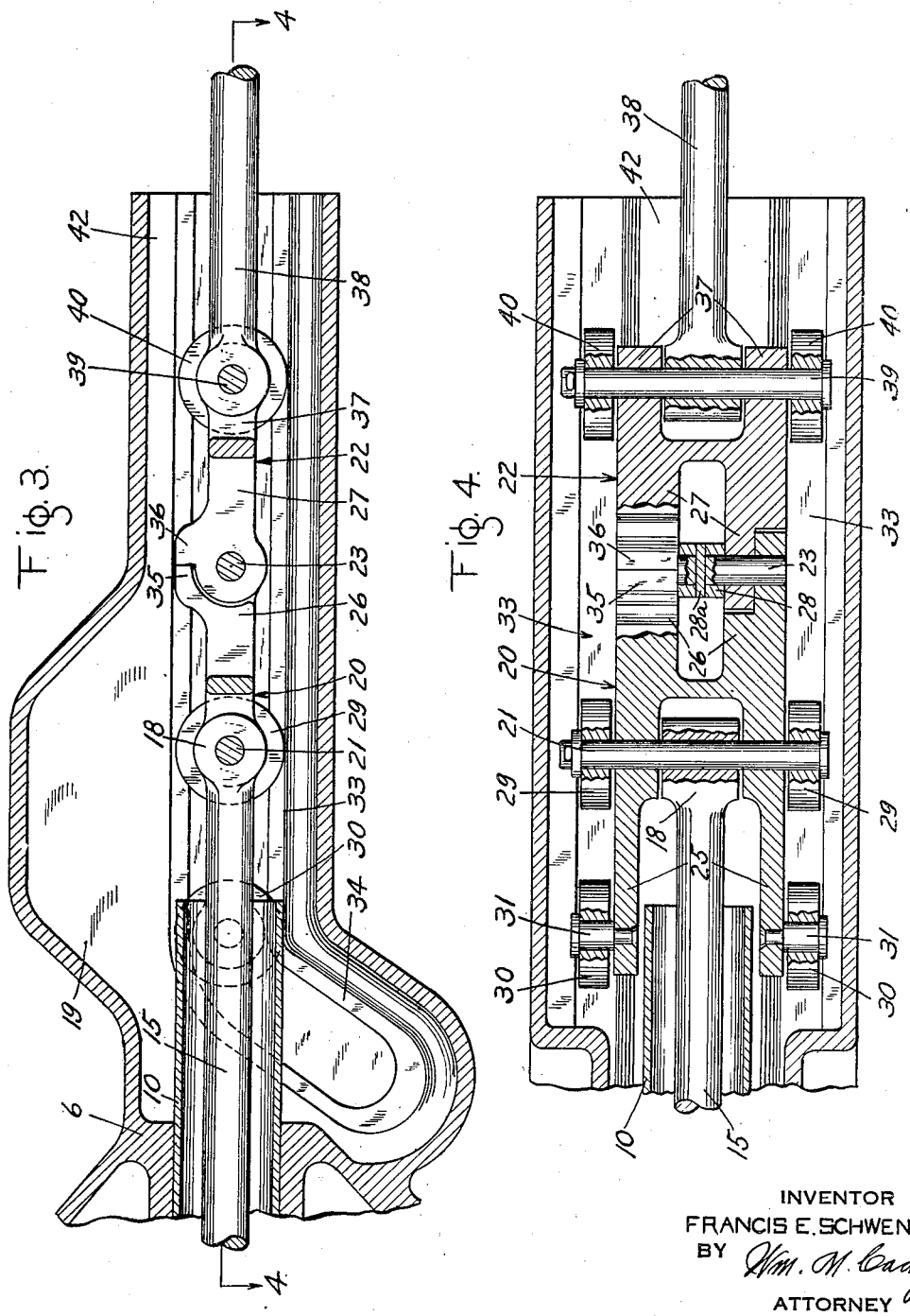

Patented July 11, 1939

2,165,985

UNITED STATES PATENT OFFICE 2,165,985

PISTON TRAVEL AMPLIFIER

Francis E. Schwentler, St. Louis, Mo., assignor to The Westinghouse Air Brake Company, Wilmerding, Pa., a corporation of Pennsylvania Application May 22, 1937, Serial No. 144,238

4 Claims. (Cl. 74—516)

This invention relates to mechanisms of the type responsive to movement of a driving member for effecting amplified movement of a driven member, and more particularly to vehicle brake apparatus for quickly taking up slack in the brake rigging during operation of a brake cylinder.

It is desirable that the brake cylinder in a fluid pressure brake equipment be designed to apply adequate braking force through the usual brake rigging with a minimum amount of brake cylinder displacement, thereby enabling control of the brakes with a relatively small volume of fluid under pressure such as may readily be supplied throughout a long train. Means has heretofore been proposed for effecting the above result, one type of apparatus comprising a small cylinder initially operative to take up the slack in the brake rigging and to cause the brake shoes to engage the wheels, and a main brake cylinder which is subsequently operative to increase the force with which the brakes are applied. For certain classes of service, however, slack take-up apparatus of a simpler and less expensive design may be more suitable.

It is an object of my invention to provide improved means cooperative with a single brake cylinder piston to take up slack in the brake rigging, so as to enable adequate braking force to be applied upon a relatively small movement of the brake cylinder piston, so that the application of the brakes may be effected with a minimum volume of fluid under pressure.

Another object of my invention is to provide piston travel amplifier means adapted to be interposed between the brake cylinder piston rod and the usual brake lever mechanism constituting the brake rigging, which means is first operative during initial movement of the brake cylinder piston to accelerate movement of the brake levers for taking up the slack in the rigging, and then to transmit the full braking force exerted by the brake cylinder piston for effecting an application of the brakes.

Other objects and advantages will appear in the following more detailed description of the invention, taken in connection with the accompanying drawings, wherein:

Fig. 1 is a sectional view of a brake cylinder having one embodiment of my invention associated therewith;

Fig. 2 is a sectional view taken substantially on the line 2—2 of Fig. 1;

Fig. 3 is a fragmentary sectional view showing the piston travel amplifying mechanism in a brake application position thereof;

Fig. 4 is a sectional view taken substantially on the line 4—4 of Fig. 3.

Fig. 5 is a diagrammatic view illustrating in simplified form a method of mounting the brake shoes; and Fig. 6 is a sectional view on a reduced scale showing my invention associated with another type of brake cylinder.

Referring to Fig. 1 of the drawings, there is provided a brake cylinder casing 1 within which is slidably mounted a brake cylinder piston 2 having on one side a pressure chamber 3, which is adapted to be supplied with fluid under pressure by way of a pipe 4. A casing section 6 is mounted on the non-pressure end of the brake cylinder casing 1 and is secured thereto by suitable means such as bolts, not shown, and closes an atmospheric chamber 7 which is formed at the side of the piston 2 opposite that adjacent the pressure chamber 3, which chamber 7 is open to the atmosphere through an opening 8 formed in the casing section 6 within which may be secured an air strainer 9. Centrally secured to the brake cylinder piston 2 is a hollow sleeve member 10, which extends through the chamber 7 and is mounted in sliding engagement in a suitable bore 11 formed in the casing section 6 for guiding movement of the piston 2. A coil spring 12 is interposed between the casing section 6 and the piston 2 within the chamber 7, and is adapted to urge the piston 2 toward the left-hand as viewed in the drawings.

Disposed within the sleeve member 10 is a piston rod 15 having an inner or free end 16 in operative engagement with the piston 2 as shown in Fig. 1. The other end 18 of the piston rod 15 extends outwardly of the open end of the hollow sleeve member 10 and into a chamber 19, which is formed in the casing section 6 and which, in accordance with my invention, contains a piston travel amplifier mechanism adapted to effect operation of the usual brake rigging in response to movement of the brake cylinder piston 2.

The piston travel amplifier mechanism comprises a toggle lever 20 pivotally mounted intermediate its ends on a transversely disposed pin 21 which is journaled in the end 18 of the piston rod, and a toggle lever or link 22 which is pivotally connected by means of a pin 23 to the lever 20. As is best shown in Fig. 4 of the drawings, one end of the toggle lever 20 is bifurcated to form a pair of parallel legs 25 which are adapted to straddle the end 18 of the piston rod and the portion of the sleeve member 10 within the chamber 19, and the other end of said toggle lever is similarly divided to form parallel legs 26, which have suitably off-set or scarfed inner surfaces adapted to engage and overlap the complementary off-set surfaces of a pair of spaced legs 27 formed on the link 22. It will be noted that the pin 23 connecting the respective legs 26 and 27 extends through a collar 28, which is interposed between the legs 27 and is keyed to the pin by means of a rivet 28a. Both sets of the connected legs 26 and 27 are provided with interlocking lugs 35 and 36, respectively, which are adapted to engage when the toggle levers 20 and 22 are in the aligned position illustrated in Figs. 3 and 4.

The toggle lever 20 is provided with a pair of rollers 29 which are rotatably mounted on the ends of the pin 21 projecting outwardly of the toggle lever, and with a similar pair of rollers 30, each of which is journaled on one of the legs 25 by means of a pin 31. The rollers 30 are spaced apart by substantially the same distance as that between the rollers 29 and each of said rollers is operatively mounted within one of two parallel guide channels or races, indicated generally at 33, which are formed in the casing section 6 on opposite sides of the chamber 19 and are adapted to guide movement of the rollers as hereinafter described.

As shown in Figs. 1 and 3 of the drawings, the guide races 33 are curved in the regions adjacent the brake cylinder to provide inclined end portions 34, which extend at an angle with respect to the longitudinal axis of the brake cylinder and of the piston rod 15. The end portions 34 of the races are adapted to receive the respective rollers 30 on the legs 25 for causing the toggle lever 20 to be tilted out of alignment with the piston rod 15 when the apparatus is in the left-hand or release position as viewed in the drawings.

Two parallel legs 37 are formed on the end of the toggle lever 22 opposite that carrying the pin 23 and one end of a brake controlling member or rod 38 is interposed between said legs and is pivotally connected thereto by means of a transversely disposed pin 39, which is similar to the pin 21. One of a pair of rollers 40 is rotatably mounted on each of the projecting ends of the pin 39 outwardly of the toggle lever 22, which rollers are operatively disposed in the respective guide races 33. The brake rod 38 extends outwardly through an opening 42 formed in the end of the casing section 6, and the outer end of the rod is provided with suitable lugs 43 by means of which said rod may be operatively connected to the usual brake levers of a car. The brake rod 38 is adapted to be normally biased toward the left-hand, as viewed in Fig. 1 of the drawings, by the weight of the usual brake shoes, acting through the medium of the rigging, one type of which is illustrated diagrammatically in Fig. 5.

As shown in Fig. 5, brake shoes 45 and 46 are provided for engaging the wheels 47 and 48 respectively, the shoe 45 being supported on a hanger 49 and operatively connected by means of a beam 50 to a truck dead lever 51 having its upper end fulcrumed at 52, and the shoe 46 being mounted on a hanger 54 and operatively connected by a beam 55 to a truck live lever 56, the lower end of which is operatively connected by means of a rod 57 to the lower end of lever 51. A pull rod 58 is pivotally connected to the upper end of the lever 56 and to one end of a usual brake cylinder lever 59, which is fulcrumed intermediate its ends at 60 and is pivotally connected at the other end to the brake rod 38. If the brake rod 38 is moved to the right by operation of the brake cylinder apparatus as hereinafter described, the lever 59 is turned in a clockwise direction about the fulcrum 60 and moves the pull rod 58 toward the left. In so moving the rod 58 operates the lever 56 and beam 55 to draw the shoe 46 into engagement with the wheel 48, after which said lever is tilted about its connection with said beam as a fulcrum so as to move the rod 57 to the right, thereby operating the lever 51, to force the shoe 45 against the wheel 47. It will be noted that the shoes 45 and 46 are so mounted that the force of gravity acting thereon will urge both shoes away from the respective wheels 47 and 48, thereby causing the various levers connected thereto normally to bias the brake rod 38 toward the left-hand.

With the fluid pressure brake apparatus in the release position, the piston chamber 3 in the brake cylinder casing 1 is connected to the atmosphere by way of the brake cylinder pipe 4 and other communications established in the well known manner by means of a brake controlling valve device, not shown, and the spring 12 is thus permitted to maintain the brake cylinder piston 2 in the release position as shown in Fig. 1 of the drawings. Since the brake rod 38 is biased toward the left-hand in the manner already described, said brake rod is thus caused to act through the medium of the toggle levers 20 and 22 to urge the piston rod 15 connected thereto toward the left-hand so that the piston rod remains in engagement with the piston 2 and the connected toggle levers are maintained in the tilted positions as shown in Fig. 1, due to the engagement of the rollers 30 carried by the legs 25 in the portions 34 of the guide races formed in the casing section 6.

When it is desired to effect an application of the brakes, fluid under pressure is supplied in the usual manner through the pipe 4 to the chamber 3 in the brake cylinder and acts against the piston 2 to move the piston toward the right-hand as viewed in Fig. 1, overcoming the force of the spring 12. In so moving, the piston 2 carries with it the piston rod 15, the pin 21 and the toggle lever 20, which is at the same time tilted in a clockwise direction about the pin 21 as the rollers 30 are moved along the respective portions 34 of the guide races. In so moving the toggle lever 20 acts through the medium of the pin 23 and the toggle lever 22 to shift the brake rod 38 toward the right-hand, the pin 23 being at the same time moved downwardly while the lever 22 is turned in a counterclockwise direction about the pin 39.

As the movement of the piston 2 is continued, the piston rod 15 further operates the toggle levers 22 and 20 as above described until the rollers 30 are pulled out of the guide race portions 34 into the guide races 33 within the plane of travel of the rollers 29 and 40. The toggle levers are thereby moved into alignment with the piston rod 15 and the brake rod 38, while the respective lugs 35 and 36 are brought into engagement as shown in Fig. 3.

It will be understood that by reason of operation of the toggle lever mechanism during the initial movement of the brake cylinder piston 2 as just described, the brake rod 38 is moved toward the right-hand at a more rapid rate than that of movement of the piston, the distance between the pins 21 and 39 carried on the rods 15 and 38, respectively, being considerably increased while the apparatus is operated from the release position shown in Fig. 1 of the drawings into the position shown in Fig. 3. This rapid initial movement of the brake rod 38 is effective to take up substantially all of the slack in the brake rigging and to bring the brake shoes into engagement with the wheels in the manner hereinbefore explained. After the toggle lever mechanism has been thus operated to take up the slack by the initial movement of the brake cylinder piston and is positioned as shown in Fig. 3, the full force of fluid under pressure acting on the piston is transmitted through the aligned piston rod 15, toggle levers 20 and 22 and rod 38 for effecting an application of the brakes.

In order to effect the release of the brakes, fluid under pressure is vented from the brake cylinder chamber 3 by way of the pipe 4 and communications established in the usual manner by the brake controlling valve device, so that the spring 12 is permitted to shift the piston 2 to the left as viewed in Fig. 1. As the piston is thus moved to release position, the biasing force caused by the weight of the brake shoes and transmitted through the brake rigging to the brake rod 38 in the manner hereinbefore explained becomes effective to move the rod 38, the toggle levers 22 and 20, and the piston rod 15 in the same direction as the piston 2. Upon movement of the rollers 30 carried by the legs 25 of the toggle lever 20 into the inclined ends 34 of guide races 33, the toggle lever 20 is tilted in a counterclockwise direction about the pin 21, thereby lifting the pin 23 so as to turn the toggle lever 22 about the pin 39 for permitting the brake rod 38 to be again shifted inwardly with respect to the piston rod 15 to the release position illustrated in Fig. 1.

In Fig. 6 of the drawings my invention is shown in association with a brake cylinder of a design somewhat different from that of the brake cylinder shown in Fig. 1, and comprising a cylinder portion 62 and a pressure head 61 secured thereto, the casing section 6 being secured to the open end of the brake cylinder portion 62. Within the cylinder portion 62 is slidably mounted a piston 63 having on one side a piston chamber 64 that is adapted to be supplied with fluid under pressure by way of a brake cylinder pipe 65. The piston 63 is provided with piston rod 67 which is rigidly secured to the piston and extends through an atmospheric chamber 68 formed in the brake cylinder and through a suitable bore provided in the casing section 6 into the chamber 19 containing the travel amplifier mechanism. The free end 69 of the piston rod 67 is pivotally connected by means of the pin 21 to the toggle lever 20 of the piston travel amplifier mechanism, which is otherwise similar to that shown in Fig. 1 of the drawings.

Interposed between the brake cylinder piston 63 and the casing section 6 is a coil spring 70 which is adapted to urge the piston toward the left-hand into release position. It will be apparent that, since the piston rod 67 is secured to the piston 63, the spring 70 is normally effective to act through the medium of the piston and piston rod to maintain the toggle lever 20 and the other elements of the piston travel amplifier mechanism associated therewith in the release position illustrated in Fig. 6. The operation of the apparatus shown in Fig. 6 will readily be understood from the description hereinbefore presented in connection with the equipment shown in Fig. 1 of the drawings.

It will thus be seen that I have provided travel amplifier means associated with a piston and adapted to be operated thereby for initially effecting movement of an operating member through a greater distance than that traversed by the piston, and for then transmitting to the member the full force exerted by the piston. It should be understood, however, that the invention has been disclosed in this form for the purpose of illustration and that the travel amplifier means may be employed with a driving element other than a piston if desired.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In combination, a cylinder, a piston having a piston rod and operatively mounted in said cylinder, a lever, a pin pivotally connecting said lever intermediate the ends thereof to said piston rod, a roller journaled on said pin, another roller rotatably mounted on one end of said lever, and stationary means constituting a guide race for said rollers, said guide race having one portion parallel to said piston rod adapted to receive both rollers when said piston is moved in one direction for guiding said lever into alignment with the axis of the piston rod, and another portion adapted to receive said other roller on movement of the piston in another direction for effecting rotation of said lever about said pin into a position at an angle to the axis of said piston rod.

2. In a toggle mechanism, in combination, a longitudinally movable member, a bifurcated toggle lever pivotally connected intermediate its ends to said movable member, one end of said lever having a lug formed thereon, a member associated with said toggle mechanism having inclined guide channels adapted to receive the other end of said toggle lever for tilting said lever out of alignment with the movable member when said elements are shifted in one direction and for causing said lever to turn into alignment with the member when shifted in the opposite direction, and a toggle link pivotally connected to said toggle lever and carrying a lug complementary to and engageable with said lug on the lever when the link and lever are aligned.

3. In combination, a piston rod, a brake rod operating member, said brake rod operating member being operatively aligned at one end of and for movement in a pathway coincident with that of said piston rod, a lever pivoted intermediate its ends to the end of said piston rod adjacent said member, a link pivoted to one end of said lever and to said member, and means operative upon movement of said piston rod to cause rotation of said lever and link to thus cause movement of said brake rod operating member at a rate different from that of said piston rod, whereby said member operates in effect as an extension of said piston rod.

4. Piston travel amplifier mechanism for a piston having a piston rod, comprising a lever, pivot means connecting said lever intermediate the ends thereof to said piston rod, guide means carried on one end of said lever, and stationary means constituting a guide race for said pivot means and said guide means, said guide race having one portion parallel to said piston rod adapted to receive both said pivot means and guide means when the piston is moved in one direction for guiding said lever toward alignment with the axis of the piston rod, and another portion adapted to receive said guide means on the end of the lever, on movement of the piston in another direction, for effecting rotation of said lever about said pivotal connection with the piston rod into a position at an angle to the axis of said rod.

FRANCIS E. SCHWENTLER.